United States Patent
Baldwin et al.

(10) Patent No.: US 7,177,506 B2
(45) Date of Patent: Feb. 13, 2007

(54) METHOD FOR FORMING AN ALIGNED OPTICAL SUB-ASSEMBLY

(75) Inventors: David Alan Baldwin, Annandale, VA (US); Michael Joseph Minnemann, Washington, DC (US)

(73) Assignee: 4 Wave, Inc., Sterling, VA (US)

( * ) Notice: Subject to any disclaimer, the term of this patent is extended or adjusted under 35 U.S.C. 154(b) by 123 days.

(21) Appl. No.: 10/819,085

(22) Filed: Apr. 6, 2004

(65) Prior Publication Data
US 2005/0220416 A1    Oct. 6, 2005

(51) Int. Cl.
*G02B 6/26* (2006.01)

(52) U.S. Cl. .......................... 385/52; 385/34; 385/35; 385/88

(58) Field of Classification Search .................. 385/14, 385/33–36, 88–94
See application file for complete search history.

(56) References Cited

U.S. PATENT DOCUMENTS

2004/0218870 A1* 11/2004 Blauvelt et al. .............. 385/50

\* cited by examiner

*Primary Examiner*—Kevin S. Wood
(74) *Attorney, Agent, or Firm*—Morgan Lewis & Bockius LLP

(57) ABSTRACT

A bench-joining optical component and a first optical component are aligned on a first optical bench, and then rigidly coupled to the first bench, in order to form a first portion of an optical subassembly. Following completion of the first portion, all components in the first portion are pre-aligned and fixed with respect to each other, moving as a unit. A third optical component is aligned and permanently coupled to a second optical bench, in order to form a second portion of the optical sub-assembly. The first and second portions of optical sub-assembly are combined by positioning an exposed side of the bench joining optical component on the second bench, aligning the bench-joining optical component with the third optical component on the second bench, and permanently securing the bench-joining optical component to the second bench.

26 Claims, 14 Drawing Sheets

METHOD FOR FORMING AN ALIGNED OPTICAL SUB-ASSEMBLY

FIELD OF THE INVENTION

The present invention is directed to methods for manufacturing optical sub-assemblies.

BACKGROUND OF THE INVENTION

Fiber optic communications networks are enhanced and made cheaper by increased integration of components, sub-assemblies, modules and systems. At the sub-assembly level, this may entail incorporating several optoelectronic and optical components such that these components share a common optical path. For example, IEEE standard 802.3ae, published on 13 Jun. 2002, relates to 10 gigabit/second optical Ethernet and calls for four wavelengths (~1275, 1300, 1325 and 1350 nm) of light to be simultaneously transmitted on a single optical fiber. Fiber optic communications networks also desirably have smaller and cheaper components, sub-assemblies and modules. Continuing with the 10 gigabit/second optical Ethernet example, optical transceiver modules, which convert electrical signals to optical signals on a transmit channel and optical signals to electrical signals on a receive channel, compliant with the IEEE 802.3ae standard are further defined by the manufacturers of these transceivers according to multi-source agreements (MSAs). Several of these MSAs (known by various codes: X2, XPAK, XFP) require small optical transmit/receive sub-assemblies, on the order of 1000 mm$^3$ or less for both functions. Moreover, the historical cost trends for Ethernet and the expected future mass deployment (millions of ports) require that the cost of such sub-assemblies be low. Ideally, the manufacture of such sub-assemblies would be automated.

Continuing with the above example, an optical sub-assembly that performs a multiple-wavelength multiplexing and transmit function may include several laser diodes, a lens (at the output of each laser diode) that focuses or collimates the light of each wavelength, a multiplexer that combines the different wavelengths into a combined optical signal, a lens that focuses the light signal output from the multiplexer and an output optical fiber for distance-transmission of the combined optical signal from the optical sub-assembly. In order for the sub-assembly to function properly, the outputs of the laser diodes must be properly aligned with the lenses, which, in turn, must be properly aligned with the inputs to the multiplexer, and the output of the multiplexer must be aligned with the output lens, which, in turn, must be aligned with the output optical fiber. In the case when the optical fiber is single-mode fiber, as is the case in part of the IEEE 802.3ae standard, the tolerances for this alignment approach ±1 µm, since a typical core diameter of the fiber is 9 µm. Those familiar with the art will recognize that the need to align multiple optoelectronic components (laser diodes, in this example) significantly increases the difficulty of manufacture.

It is known in prior art to align one optoelectronic device to one single-mode fiber, possibly including intermediary optical components such as a lens. The most reliable method for such alignment is "active alignment", practiced for many years, in which the optoelectronic device is energized and the various components are moved relative to each other in order to obtain an acceptable throughput of optical signal, then the components are secured in place. Wang et al teach in U.S. Pat. No. 6,698,940 an automate-able version of this method, but the method is limited by being applicable to one style of sub-assembly package and is not readily extendable to align multiple optoelectronic components. Another alignment method is "passive alignment", in which all the components are located by stops, indentations in an optical bench (or substrate), or placed with reference to precision fiducial marks, or other means. By way of example, from among many, Verdiell teaches in U.S. Pat. No. 6,376,268 the use of various steps and raised structures to assist in placement of components, and Chang et al teach in U.S. Pat. No. 6,485,198 the use of balls mating with indentations in components and substrates to assist in placement of components. Such methods would be readily extendable to align multiple optoelectronic components, but, along with much prior art involving passive alignment, these methods are of limited applicability because of the mechanical imprecision of the optoelectronic device die themselves. While the semiconductor layers in optoelectronic devices are controlled in thickness to ~0.001 µm (1 nm) and the lateral semiconductor and metallization features are lithographically defined with a precision of ~0.1 µm (100 nm), the thickness of the die and the lateral cutting of the die out of a wafer have imprecision of ±10 µm or considerably more. While it might be possible to improve these tolerances to permit passive alignment, the installed base of optoelectronic production equipment, which gives rise to the ±10 µm tolerances, is so large that such a development is thought to be impractical in the next few years. In addition, a problem often encountered is that various optical components have different heights; for example, a typical optical fiber has a diameter of 125 µm with an optical axis at 62.5 µm height, while a laser diode might be 300 µm tall with an optical emission point essentially at 300 µm height. Co-locating these components on a flat optical bench would result in a mis-match of their optical path heights, the typical solution to which is providing "sub-benches" to raise smaller optical components up to a common-height optical plane. A difficulty arises, however, in that the height of the sub-benches themselves can only be controlled to ~±10 µm using existing high-precision manufacturing techniques.

A hybrid approach, combining passive and active alignment, is widely used in prior art. In this approach, as many components are passively aligned as practical, particularly including the aforementioned intermediary components between the optoelectronic component and the fiber, then a final active alignment step(s) is performed. By way of example, Von Freyhold et al teach in U.S. Pat. No. 6,616,345 one or more assembly holders, which can be moved over one or more bases along various axes, to bring groups of components into alignment, the components within any one group being passively aligned. Bergmann et al teach in U.S. Pat. No. 6,430,337 an adjustable beam steering device in an otherwise passively aligned optical path. Musk teaches in U.S. Pat. No. 6,445,858 a flexural member upon which a component is mounted such that the component can be brought into alignment with an optical path. Caracci et al teach in U.S. Pat. No. 6,445,838 polymer grippers, which allow a component to be moved to change the cavity length of a Fabry-Perot resonator, while keeping the component passively aligned in both axes transverse to the cavity length. None of these hybrid alignment approaches contemplate aligning several optoelectronic components such that these components share a common optical path.

Prior art does exist for limited cases of a few optoelectronic components sharing a common optical path. The most common types are loosely known as bi-directional optical sub-assemblies, in which a laser diode transmits optical signals in one direction in a fiber and a photo diode receives optical signals traveling in the opposite direction in the same fiber. Usually an optical filter arrangement separates the optic signals by wavelength. Ojima et al in U.S. Pat. No. 6,334,716 teach such a bi-directional sub-assembly. Tsumori in U.S. Pat. No. 6,509,989 and Althaus in U.S. Pat. No. 6,493,121 teach alternate arrangements having three optoelectronic components, adding a second photo diode for a second reception channel. Althaus in U.S. Pat. No. 6,493,121 further teaches arrangements with four, five or more optoelectronic components, generally in transmitter/receiver pairs. It is believed that alignment of these sub-assemblies, even in the simpler cases, involves individual active alignment of each optoelectronic component. According to existing art, this alignment can only readily be done if each optoelectronic component is individually pre-packaged in hermetically-sealed, thermally conductive "TO cans", with each whole can being moved to accomplish the alignment. Since a TO can has a volume of ~150 mm$^3$, a collection of these plus the common optical housing will quickly exceed the aforementioned space constraints of transceiver MSAs. In addition, upon incorporating four or more optoelectronic components, the alignment procedure becomes correspondingly more tedious and optical losses and cross-talk between channels become increasingly troublesome.

SUMMARY OF THE INVENTION

In one embodiment, the present invention provides a method for alignment of at least four optoelectronic components, along with their associated optical components, which share a common optical path. In this embodiment, the alignment is preferably good enough for coupling the combined optical path into or out of single mode fiber. Further, the alignment method preferably accommodates optical and optoelectronic components of differing height, as well as the typical ±10 µm imprecision in the dimensions of optoelectronic component die and various cut sub-benches. Further, the alignment method is preferably compatible with automated assembly methods, whether active, passive or a hybrid of these, suitable for mass production cheaply. The alignment method may be used to form optical sub-assemblies in which at least eight optoelectronic components (for example, a set of four transmitter laser diodes and a set of four receiver photo diodes), along with their associated optical components, their common optical path components and their mounting means, will all fit within a <1000 mm$^3$ volume.

In accordance with one aspect, the present invention is directed to a method for aligning optical components in order to form an aligned optical sub-assembly. By way of overview, at least two optical components are pre-aligned and secured on a first optical bench, one of said components being formed as a bench-joining component, then at least one additional optical component is pre-aligned and secured on a second optical bench, then the first and second optical benches are joined via the bench-joining component, then the second optical bench is aligned relative to the bench-joining component and finally the two benches are secured together by securing the second optical bench to the bench-joining component.

In one embodiment, a first optical component is positioned with respect to a first optical bench having an upper surface, and a bench-joining optical component is positioned relative to the upper surface of the first optical bench. Aligned optical components are next provided by moving the bench-joining optical component and/or the first optical bench until the first optical component and the bench-joining optical component are optically aligned. While the components remain aligned, at least one of the first and bench-joining optical components is permanently secured to the first optical bench.

A third optical component is permanently secured to a second optical bench having an upper surface, and the bench-joining optical component is positioned relative to the upper surface of the second optical bench. The aligned optical sub-assembly is next provided by moving the bench-joining optical component and/or the second optical bench until the bench-joining optical component and the third optical component are optically aligned, and permanently securing the bench-joining optical component to the second optical bench.

In one embodiment, the first optical component is one or more optical fibers, and the bench-joining optical component includes an optical multiplexer and a lens array. In other embodiments, the bench-joining optical component is an array of photo-detectors or an array of lenses. In another aspect of the first embodiment, the third optical component is an array of laser diodes.

In some embodiments, the first optical component is permanently secured to the first optical bench before the first optical component and the bench-joining optical component are aligned. In these embodiments, the positioning of the bench-joining optical component relative to the upper surface of the first optical bench fixes a distance between the first optical component and the bench-joining optical component. In other embodiments, the first optical component and the bench-joining optical component may both be permanently secured to the first optical bench after the first optical component and the bench-joining optical component are aligned.

In one embodiment, the bench-joining optical component is initially positioned with respect to the upper surface of the first optical bench such that translational movement of the bench-joining optical component relative to the upper surface of the first optical bench is restricted in at least one direction and rotational movement of the bench-joining optical component about at least one axis passing through the bench-joining optical component is restricted. In one example of such an embodiment, the upper surface of the first optical bench has a first plurality of stops formed thereon, and the bench-joining optical component is positioned on the upper surface of the first optical bench between the first plurality of stops, wherein the first plurality of stops restrict rotation of the bench-joining optical component about an axis perpendicular to the upper surface of the first optical bench.

The bench-joining optical component may initially be positioned with respect to the upper surface of the second optical bench such that translational movement of the bench-joining optical component relative to the upper surface of the second optical bench is restricted in at least one direction and rotational movement of the bench-joining optical component about at least one axis passing through the bench-joining optical component is restricted. In an example of such an embodiment, the upper surface of the second optical bench includes a second plurality of stops formed thereon used for positioning the bench-joining optical component on the upper surface of the second optical bench between the second plurality of stops, wherein the second plurality of stops restrict rotation of the bench-joining optical component about an axis perpendicular to the upper surface of the second optical bench.

The stops (i.e., the first plurality of stops, the second plurality of stops, or both) may be formed from a deformable, polymer material that grips the bench-joining optical component when the bench-joining optical component is positioned between the stops. In other embodiments, stops may be formed on silicon optical benches using wet-etching or chemical-plasma etching. Optionally, the stops may be positioned on the silicon optical benches using photo-lithography to achieve a positional accuracy of less than 1 μm.

BRIEF DESCRIPTION OF THE FIGURES

Throughout the drawings, like numerals are used to designate the same elements.

DETAILED DESCRIPTION OF THE PREFERRED EMBODIMENT

Figure 1:
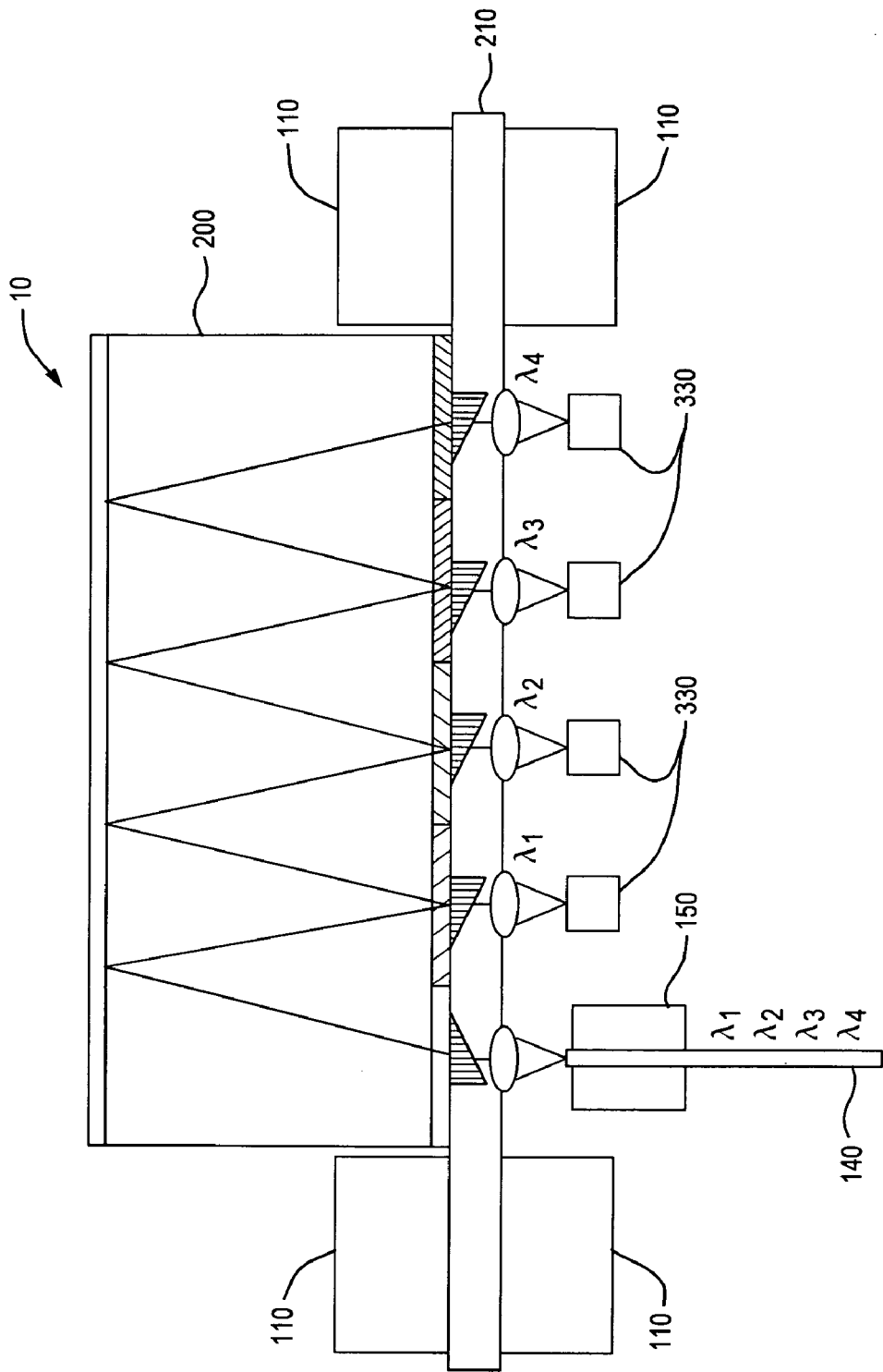
FIG. 1 is an optical schematic diagram showing the optic paths through and between components of an exemplary aligned optical subassembly formed using the present invention.

FIG. 1 is a diagram showing components of an exemplary aligned optical sub-assembly 10 formed using the present invention. The optical sub-assembly 10 shown in FIG. 1 corresponds to a four-wavelength optical multiplexer and transmitter sub-assembly. However, it will be understood by those skilled in the art that the manufacturing method of present invention may be used to form numerous different sub-assemblies that implement other optical functionality. It will also be understood by those skilled in the art that the manufacturing process of the present invention may be implemented in both manual and automated manufacturing environments.

Aligned optical sub-assembly 10 includes an optical multiplexer chip 200. Various embodiments of multiplexer chip 200, and methods for making the same, are disclosed in co-pending U.S. patent application Ser. No. 09/810,998, entitled "Multi-Channel Optical Filter And Multiplexer Formed From Stacks Of Thin-Film Layers," assigned to the assignee of the present application and incorporated herein by reference in its entirety. Sub-assembly 10 also includes a silicon lens array 210, which is positioned between multiplexer chip 200 and an array of laser diodes 330. Each of laser diodes 330 provides light of a different wavelength (e.g., $\lambda_1$, $\lambda_2$, $\lambda_3$, $\lambda_4$). Light from the laser diodes 330, which has been focused by lens array 210, enters the interior of optical multiplexer chip 200, where the different wavelengths (e.g., $\lambda_1$, $\lambda_2$, $\lambda_3$, $\lambda_4$) are combined into a single optical signal that is output via single-mode or multi-mode fiber 140. As explained more fully below, stops, such as polymer grippers 110, 150, are used to position and align both the lens array 210 (with multiplexer 200 affixed thereto) and the optical fiber 140 during manufacturing of sub-assembly 10. Suitable polymer grippers useful for implementing the present invention include C21 acrylate-based polymer material supplied by the Photonic Materials Division of Corning, Inc., as described in Corning Product Bulletin PI105 issued March 2002. Some other prior art implementations involving polymer grippers are taught by Norwood et al in U.S. Pat. No. 6,266,472; by Caracci et al in U.S. Patent Appl. 2003/0175000; and by Caracci et al in U.S. Patent Appl. 2003/0174943. In these publications, incorporated herein in their entirety by reference, details are disclosed relative to compositions, methods of manufacture and properties of polymer grippers useful for implementing the present invention.

Figure 2:
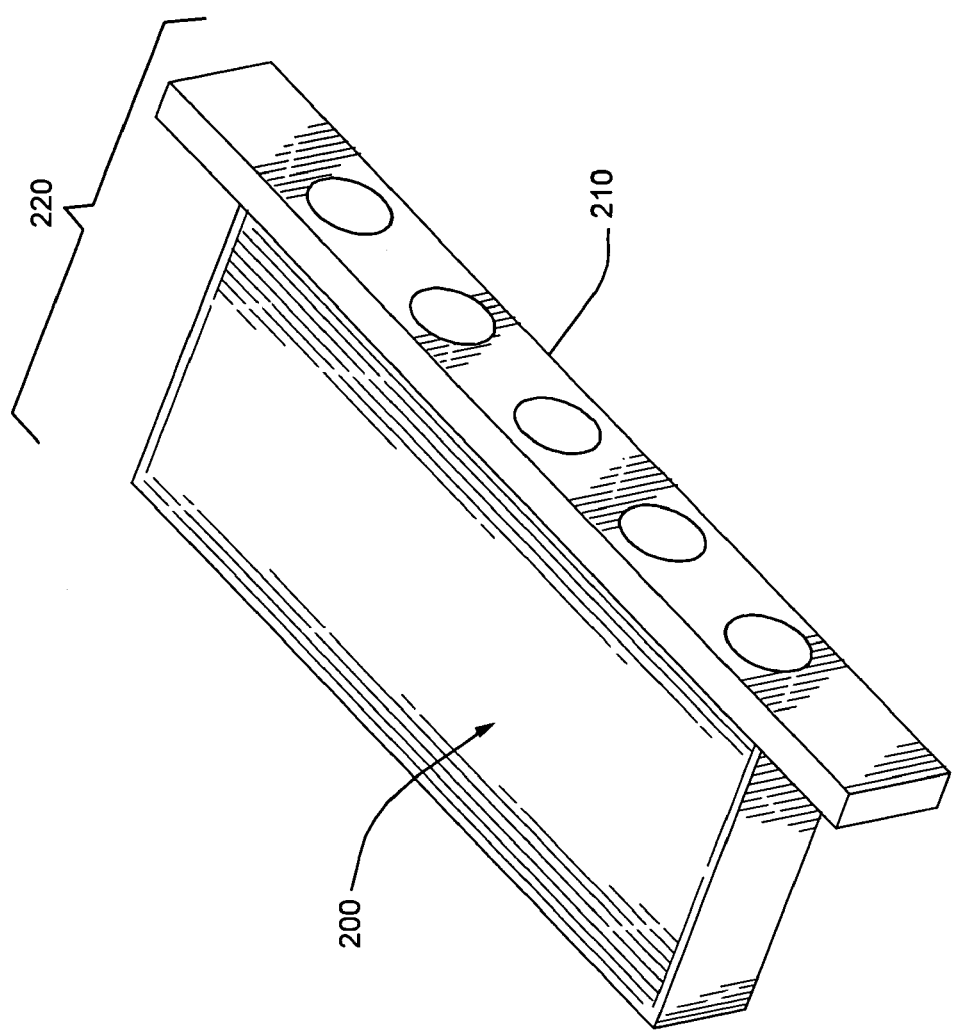
FIG. 2 shows a lens array bonded to an optical multiplexer chip to form a lensed-multiplexer chip, which also serves as a bench-joining optical component, in accordance with the present invention.

FIG. 2 shows an example of a bench-joining optical component 220, which is formed by bonding lens array 210 to optical multiplexer chip 200. Bench-joining optical component 220 is also referred to herein as a lensed-multiplexer chip. By way of overview, in the present invention, bench-joining optical component 220 and optical fiber 140 are aligned on a first silicon optical bench 100, and then rigidly coupled to the first bench 100, in order to form a first portion 160 of optical subassembly 10. An array of laser diodes 330 is aligned and permanently coupled to a second silicon optical bench 300, in order to form a second portion 350 of optical sub-assembly 10. Thereafter, the first and second portions of the optical sub-assembly are combined by positioning an exposed side of the bench joining optical component 220 (i.e., the side of bench joining optical component 220 not adjacent to bench 100) on the second bench 300, aligning the bench-joining optical component 220 with the array of laser diodes 330 on the second bench 300, and permanently securing the bench-joining optical component 220 to the second bench 300.

Figure 3:
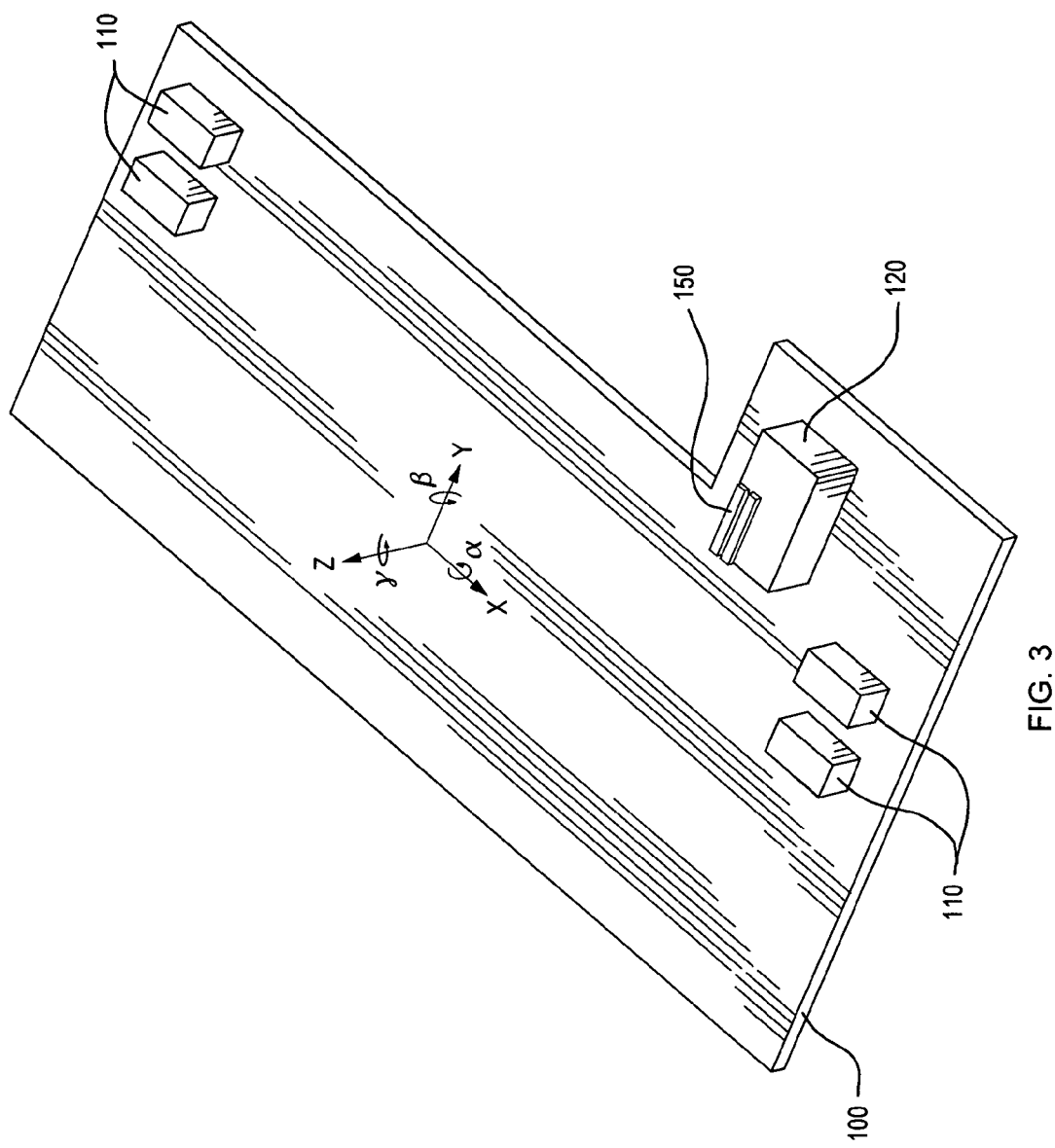
FIG. 3 shows a first silicon optical bench having two pairs of stops for positioning the lensed-multiplexer chip with respect to the first silicon optical bench, and a gripping element for positioning an optical fiber with respect to the first silicon optical bench, in accordance with the present invention.
Figure 4:
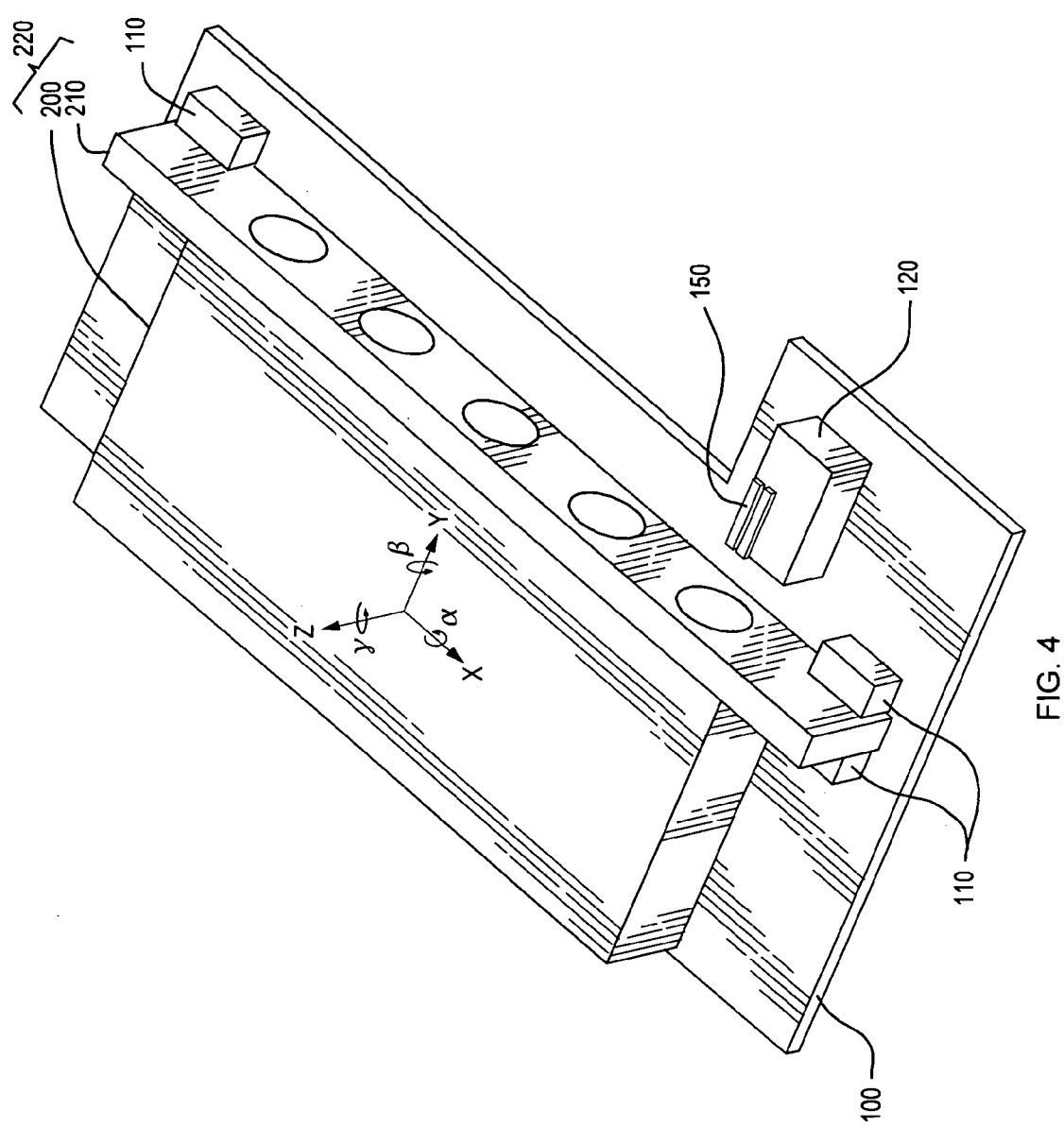
FIG. 4 shows the first silicon optical bench with the lensed-multiplexer chip positioned thereon, in accordance with the present invention.

FIGS. 3–8 illustrate the method for making the first portion 160 of the optical sub-assembly 10. FIG. 3 illustrates first silicon optical bench 100. Two pairs of stops (e.g., polymer grippers 110) are provided on optical bench 100. Sub-bench 120 is also provided on optical bench 100. Further stops (e.g., polymer grippers 150) are provided on top of sub-bench 120. As shown in FIG. 4, bench-joining optical component 220 is initially positioned against the upper surface of first bench 100, in the spaces between the pairs of polymer grippers 110. When the bench-joining optical component 220 is positioned in the spaces between the pairs of polymer grippers 110, the polymer grippers restrict rotation of the bench-joining optical component 220 about an axis perpendicular to the upper surface of optical bench 100. Polymer grippers lightly hold bench-joining optical component 220 in place relative to bench 100 in order to prevent unintended movement of bench-joining optical component 220 relative to the first bench 100 during the manufacturing process.

Figure 5:
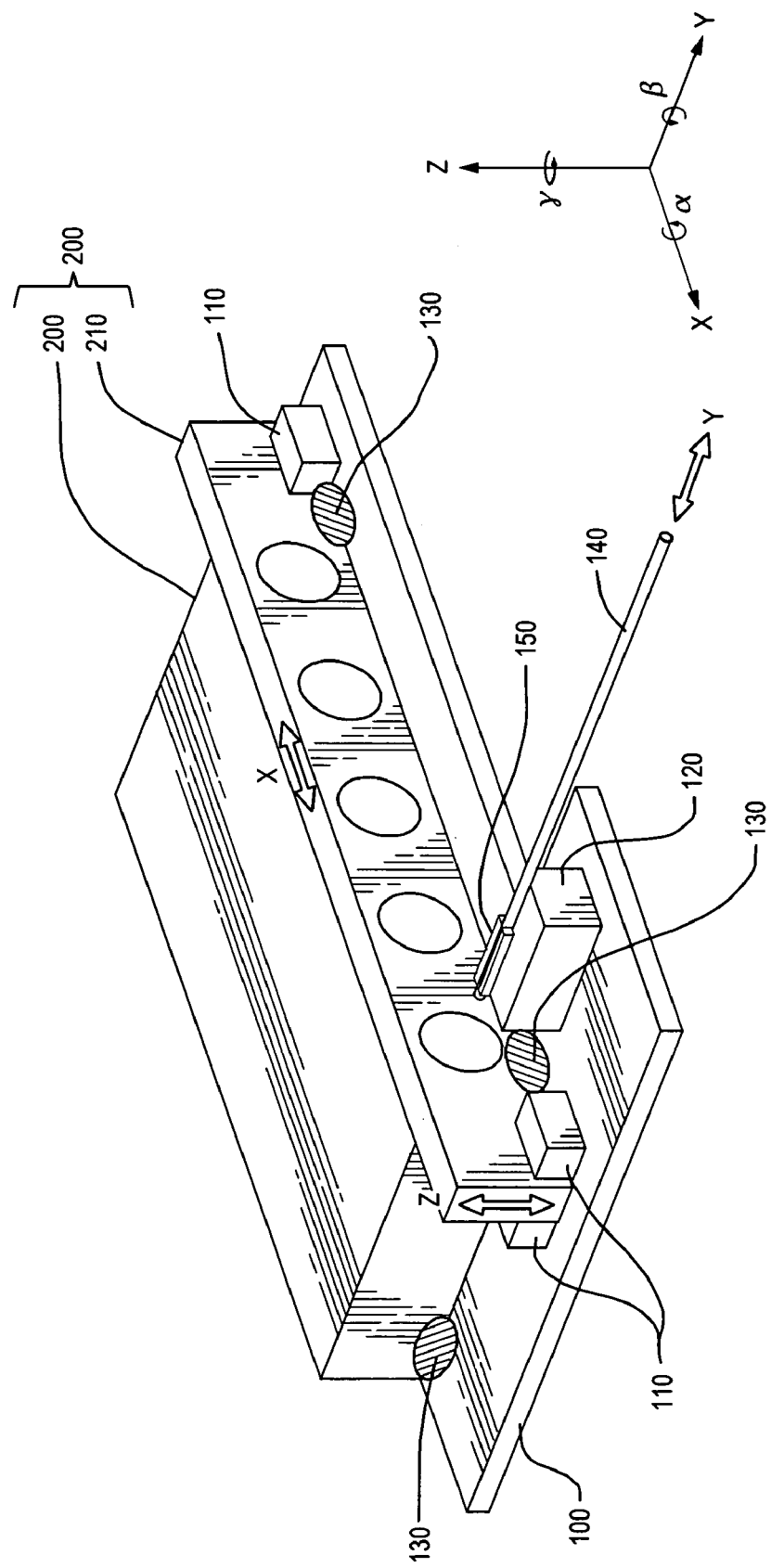
FIG. 5 illustrates a method for aligning the lensed-multiplexer chip with the optical fiber and securing the aligned components to the first silicon optical bench, in accordance with the present invention.

As shown in FIG. 5, optical fiber 140 is positioned within grippers 150, which restrict the optical fiber to movement along the Y-axis. The bench-joining optical component 220 is then aligned with optical fiber 140 using either active or passive alignment methods. During this process, the bench-joining optical component 220 may be moved along the X-axis and Z-axis as shown, in order to bring the bench-joining optical component 220 and the fiber 140 into alignment. (It will be understood that, in this alignment step, the position of the bench-joining optical component 220 relative to the first silicon optical bench 100 could be varied by moving either the bench-joining optical component 220, the first silicon optical bench 100, or both). When the bench-joining optical component 220 and the fiber 140 are aligned, a curable epoxy is applied at locations 130 in order to permanently secure the bench-joining optical component 220 on first bench 100. The optical fiber 140 may be permanently affixed relative to fiber sub-bench 120 either before or after the bench-joining optical component 220 is permanently secured to the first bench 100. When the optical fiber 140 is permanently affixed relative to fiber sub-bench 120 before the bench-joining optical component 220 is positioned on the first silicon optical bench 100, the positioning of the bench-joining optical component 200 relative to the upper surface of the first silicon optical bench 100 fixes a distance between the optical fiber 140 and the bench-joining optical component 220. When the fiber is not permanently affixed to the fiber sub-bench 120, the fiber can be moved along the Y-axis to further improve optical alignment. When optionally permanently affixing fiber 140 to sub-bench 120, curable epoxy may be used, among other means.

Figure 6:
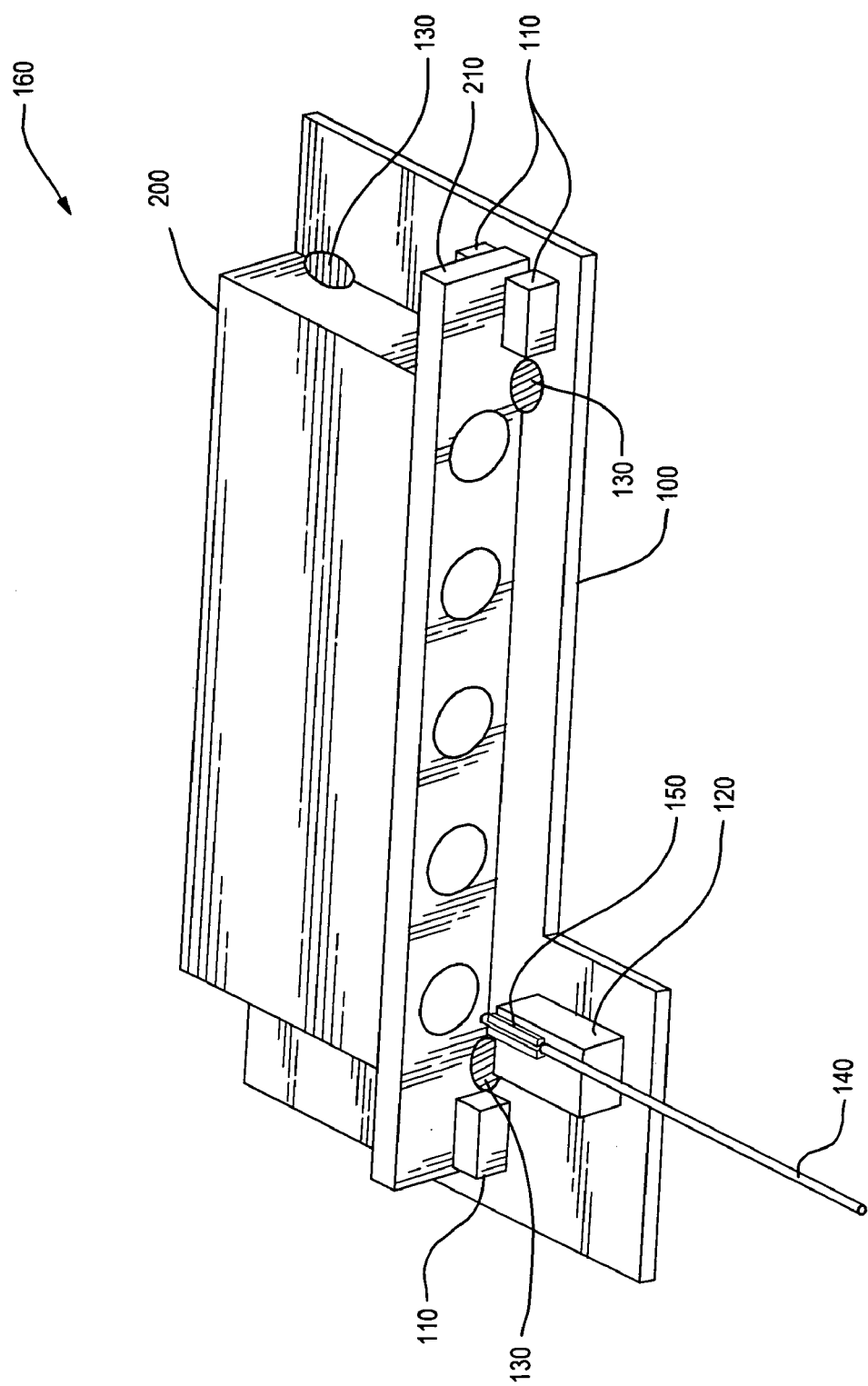
FIG. 6 illustrates a first silicon optical bench having a lensed-multiplexer aligned to an optical fiber, wherein the aligned components are secured to the first silicon optical bench, in accordance with the present invention.
Figure 7:
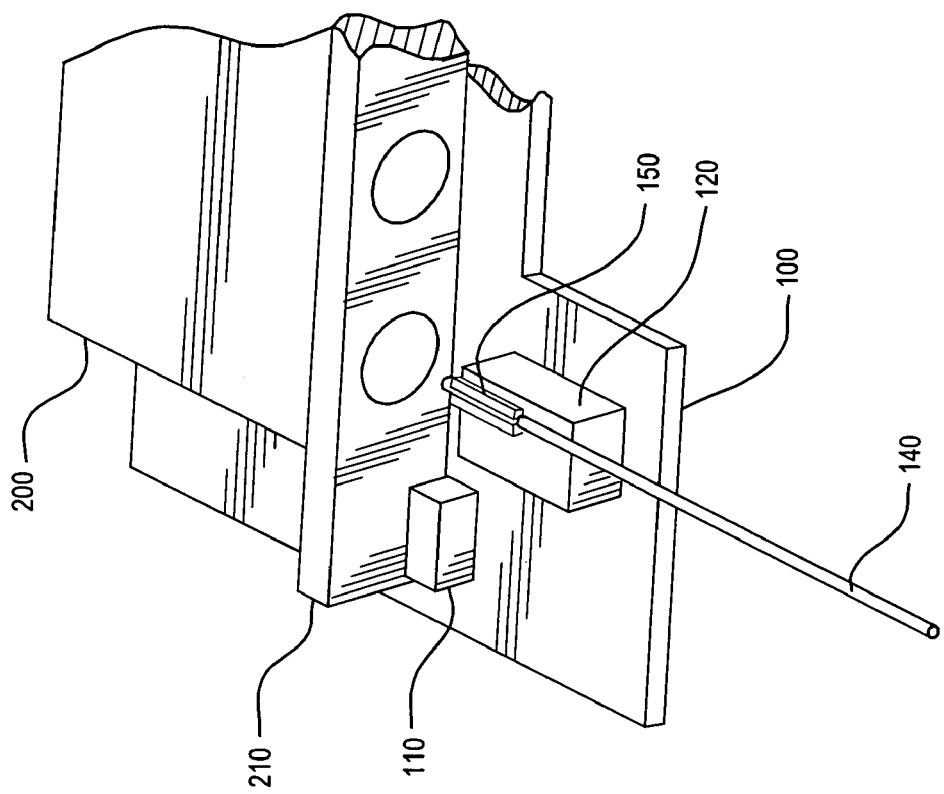
FIG. 7 is an expanded view of the gripping element for positioning the optical fiber with respect to the first silicon optical bench, in accordance with the present invention.
Figure 8:
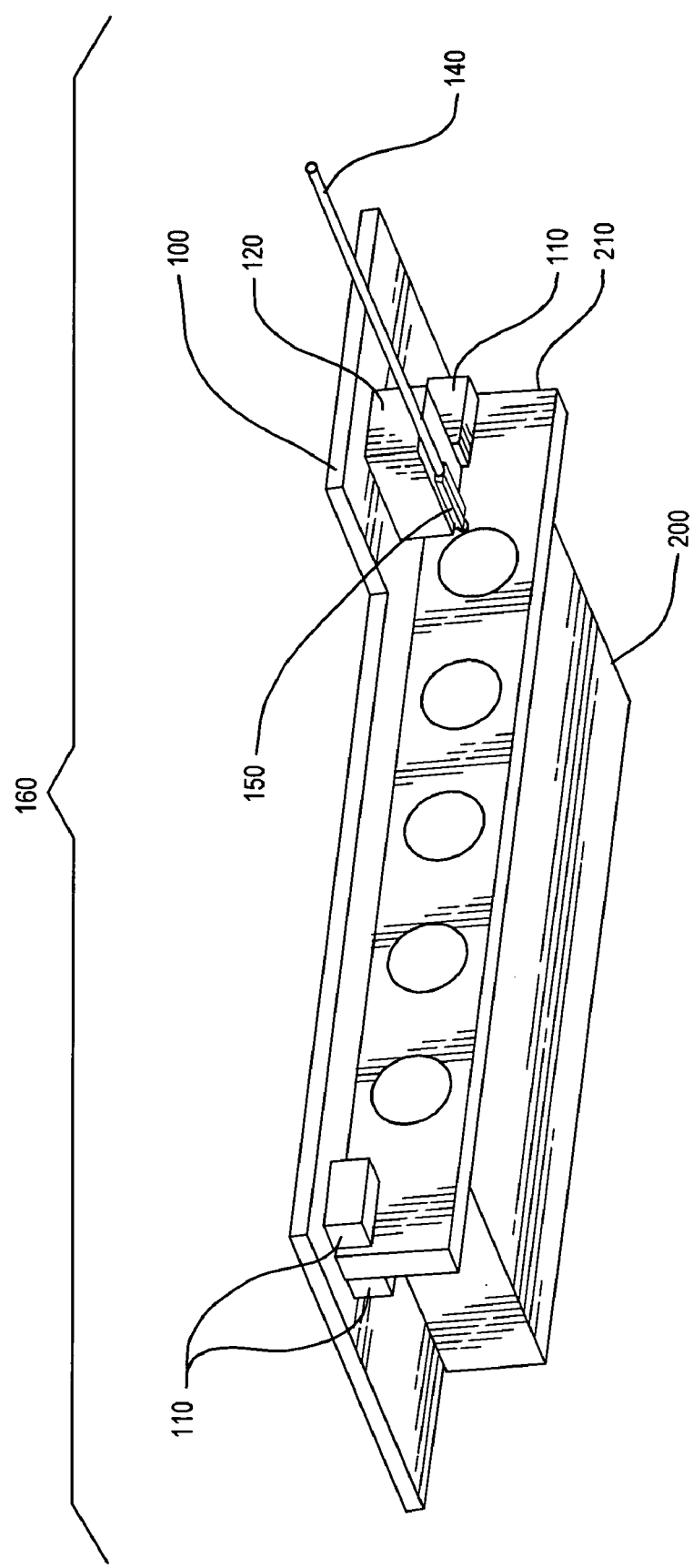
FIG. 8 is an inverted view of the portion of the sub-assembly shown in FIG. 6.

FIGS. 6–8 illustrate the first portion 160 of the optical sub-assembly 10, after the process discussed above is complete. As shown specifically in FIG. 8, following completion of the first portion 160, all components in the first portion 160 are pre-aligned and fixed with respect to each other, moving as a unit.

Although in the example shown in FIGS. 3–8, when the bench-joining optical component 220 is initially positioned on the upper surface of optical bench 100, translational movement of the bench-joining optical component 220 relative to the upper surface of optical bench 100 is restricted along the Y axis and rotation of the bench-joining optical component 220 about an axis γ perpendicular to the upper surface of optical bench 100 is restricted, it will be understood by those skilled in the art that different and/or additional degrees of freedom (either translational or rotational, e.g., α, β and/or γ rotation as shown in FIGS. 3–5) of bench-joining optical component 220 relative to optical bench 100 may alternatively be restricted during formation of first portion 160. Rules that may be useful for determining which of the degrees of freedom should be restricted include: a) the maximum practical number of degrees of freedom are preferably restricted, to minimize the number of subsequent alignment steps, b) the degrees of freedom associated with very precise and passively-alignable features of the bench-joining component and/or the optical path are preferably restricted and c) the degrees of freedom associated with relatively imprecise features of the bench-joining optical component and/or the optical path are preferably not restricted.

Figure 9:
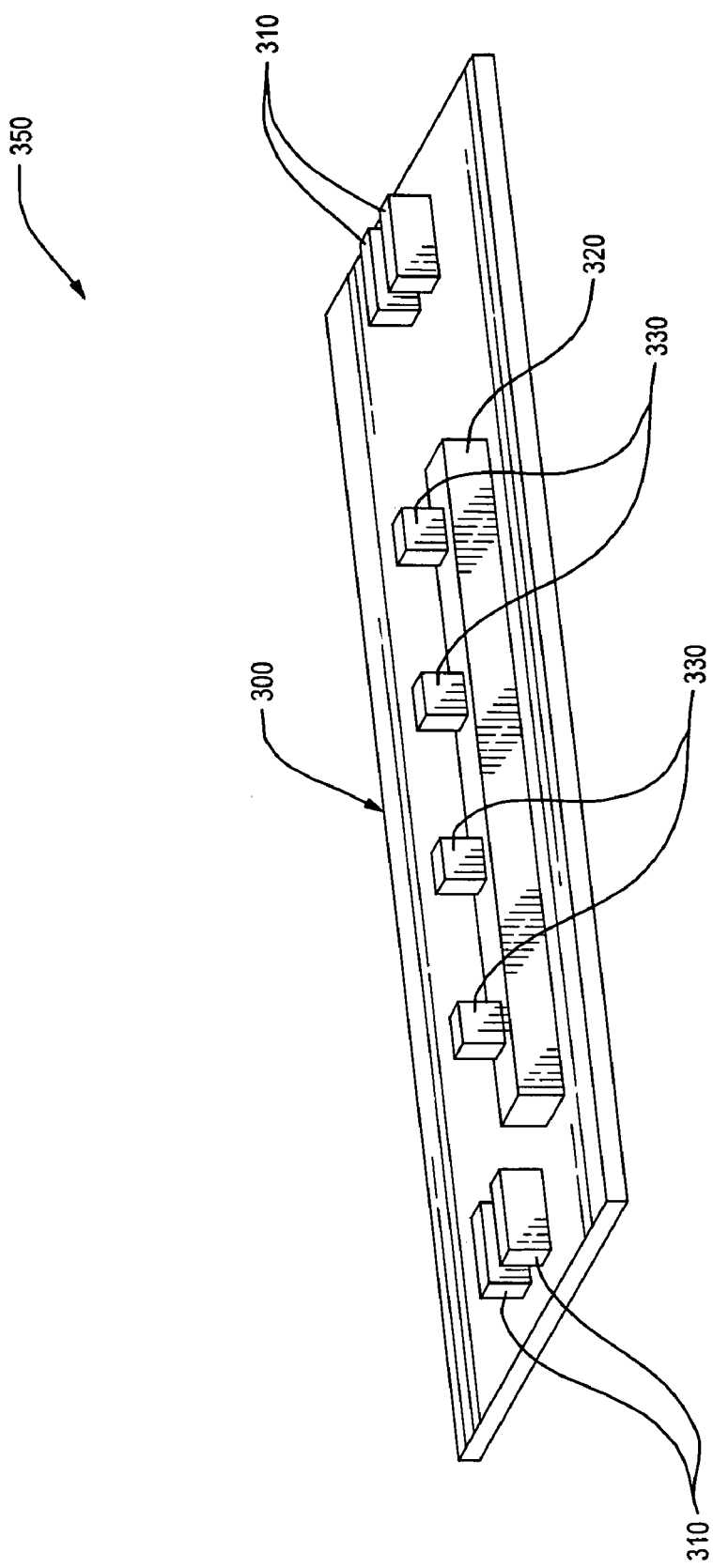
FIG. 9 shows a second silicon optical bench having two pairs of stops for positioning the lensed-multiplexer chip with respect to the second silicon optical bench, and an array of laser diodes positioned thereon, in accordance with the present invention.

FIG. 9 illustrates the method for making the second portion 350 of the optical sub-assembly 10. Two further pairs of stops (e.g., polymer grippers 310) are provided on second optical bench 300. Sub-bench 320 is also provided on optical bench 300. An array of laser diodes 330 is aligned and permanently coupled to sub-bench 320, in order to form the second portion 350 of optical sub-assembly 10. Following completion of the second portion 350, all components in the second portion 350 are fixed with respect to each other, moving as a unit.

Figure 10:
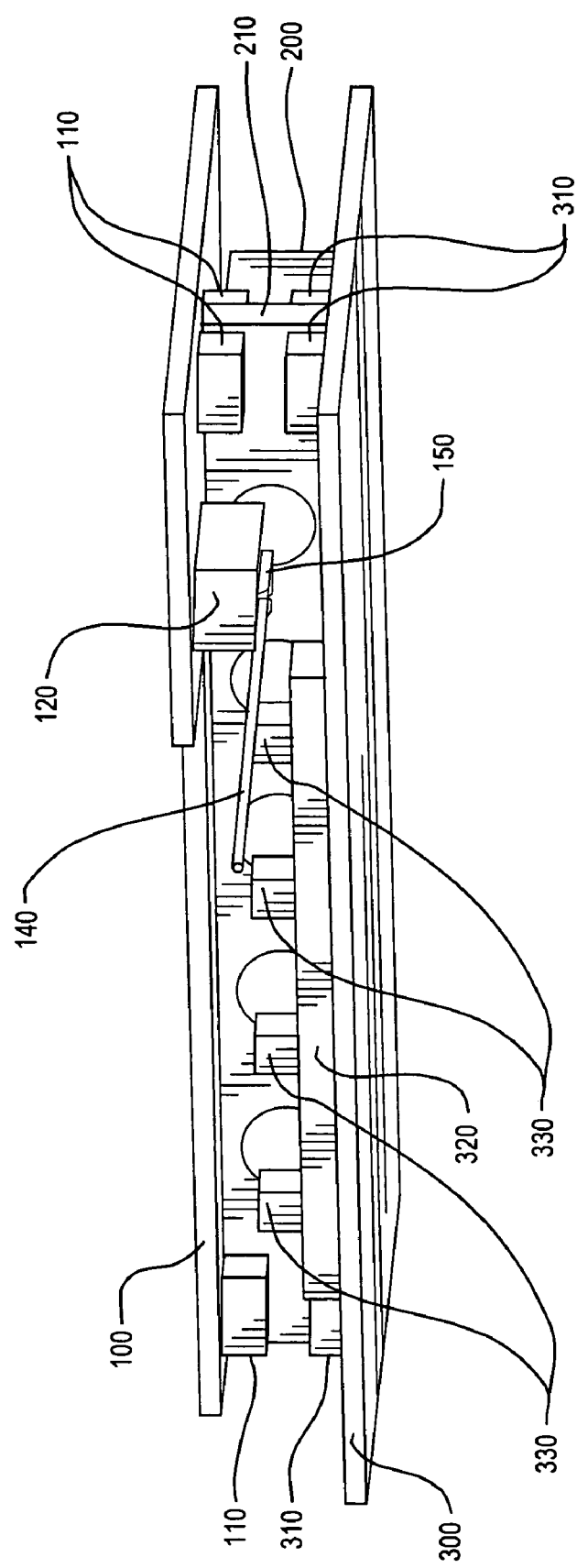
FIG. 10 shows a method for positioning the lensed-multiplexer chip (affixed to the first silicon optical bench as shown in FIG. 8) on the second silicon optical bench, in accordance with the present invention.
Figure 11:
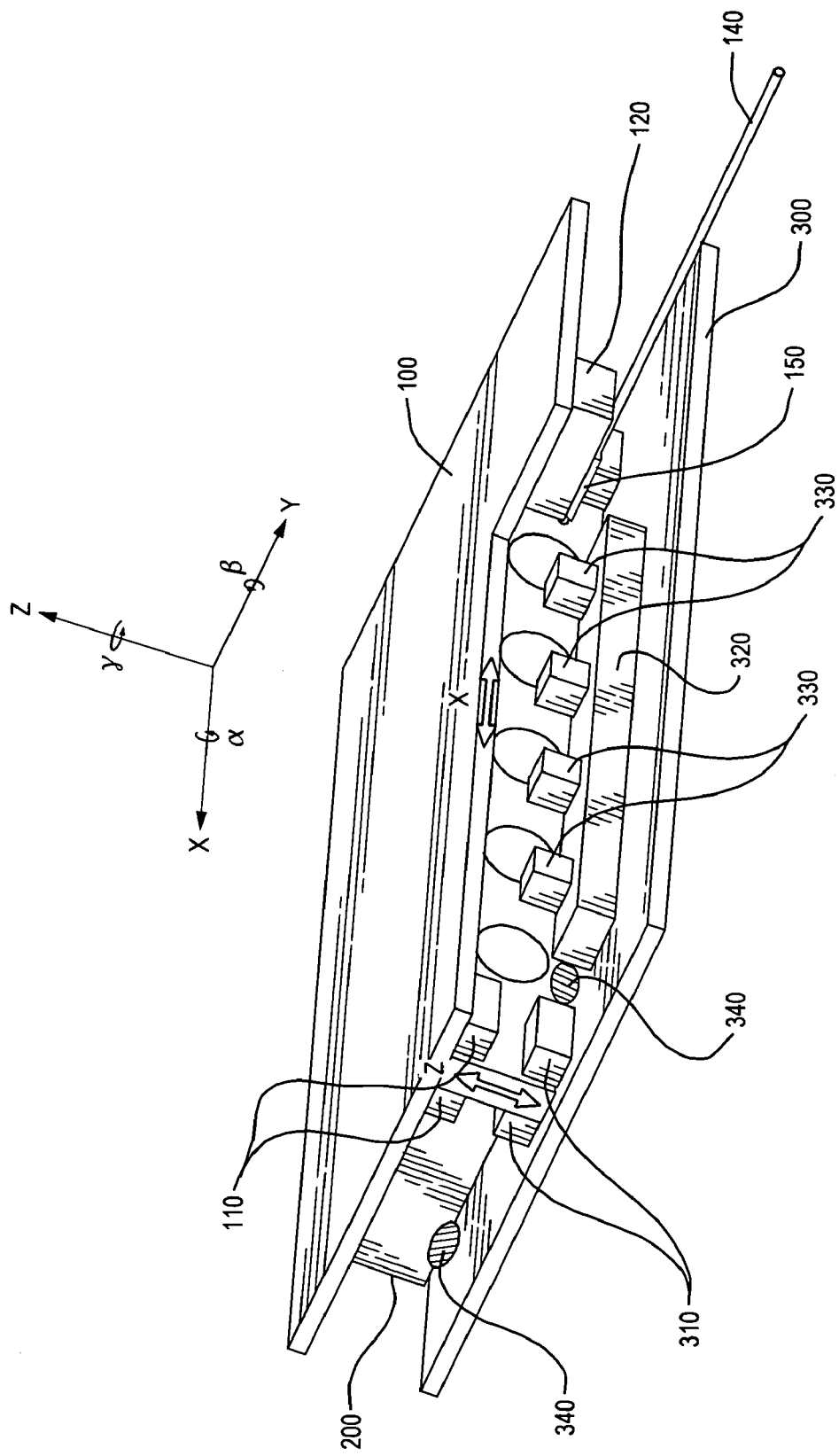
FIG. 11 shows a method for aligning the lensed-multiplexer chip with the array of laser diodes on the second silicon optical bench, in accordance with the present invention.
Figure 12:
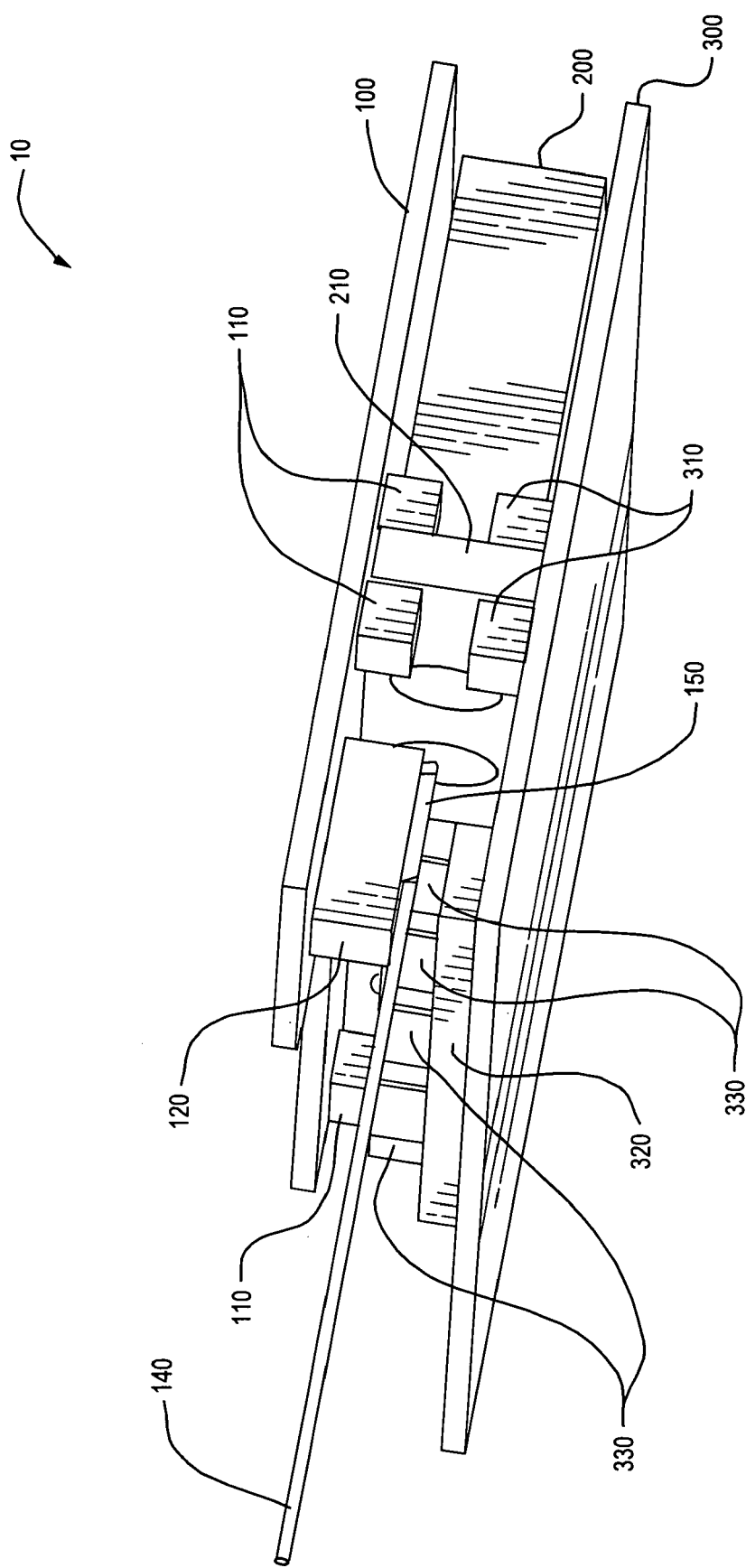
FIG. 12 shows a completed optical sub-assembly formed in accordance with the present invention.

FIGS. 10–12 illustrate the method for combining the first portion 160 of the optical sub-assembly 10 (described with reference to FIGS. 3–8 above) with the second portion 350 of the optical sub-assembly (described with reference to FIG. 9 above), in accordance with the present invention. As shown in FIG. 10, the side of bench-joining optical component 220 opposite the first optical bench 100 is positioned against the upper surface of second bench 300, in the spaces between the pairs of polymer grippers 310. When the bench-joining optical component 220 is positioned in the spaces between the pairs of polymer grippers 310, the polymer grippers restrict rotation of the bench-joining optical component 220 about an axis perpendicular to the upper surface of optical bench 300 and a distance between the array of laser diodes 330 and the bench-joining optical component 220 is fixed. Polymer grippers lightly hold bench-joining optical component 220 in place relative to bench 300 in order to prevent unintended movement of bench-joining optical component 220 relative to the first bench 300 during the manufacturing process.

As shown in FIG. 11, the bench-joining optical component 220 is then aligned with the linear array of laser diodes 330 using either active or passive alignment methods. During this process, the bench-joining optical component 220 may be moved along the X-axis and Z-axis as shown, or rotated about any axis perpendicular to the X-Z plane, in order to bring the bench-joining optical component 220 and laser diodes 330 into alignment. (It will be understood that, in this alignment step, the position of the bench-joining optical component 220 relative to the second silicon optical bench 300 could be varied by moving either the bench-joining optical component 220, the second silicon optical bench 200, or both). When the bench-joining optical component 220 and the laser diodes 330 are aligned, a curable epoxy is applied at locations 340 in order to permanently secure the bench-joining optical component 220 to the second bench 300.

FIG. 12 illustrates the completed optical sub-assembly 10, after the first portion 160 has been combined with the second portion 350, as described above. Following completion of optical sub-assembly 10, all components in the assembly are aligned and fixed with respect to each other, moving as a unit. In the embodiment shown, the upper surfaces of the silicon optical benches 100, 300 are parallel in the completed optical sub-assembly 10. In one embodiment, the total thickness of sub-assembly 10 is between 2.0 to 2.5 millimeters in the direction of the Z-axis.

Although in the example shown in FIG. 10–12, when the bench-joining optical component 220 is initially positioned on the upper surface of optical bench 300, translational movement of the bench-joining optical component 220 relative to the upper surface of optical bench 300 is restricted along the Y axis and rotation of the bench-joining optical component 220 about an axis γ perpendicular to the upper surface of optical bench 300 is restricted, it will be understood by those skilled in the art that different and/or additional degrees of freedom (either translational or rotational, e.g., α, β and/or γ rotation as shown in FIG. 11) of bench-joining optical component 220 relative to optical bench 300 may alternatively be restricted during the combining of first portion 160 with second portion 350.

As mentioned above, the inventive method of the present invention may be used to make numerous other sub-assemblies that implement different optical functionality. For example, in one alternate embodiment, an optical demultiplexer chip (not shown) may be substituted for multiplexer chip 200 and an array of photodetectors (not shown) may be substituted for the array of laser diodes 330, in order to form an aligned optical demultiplexer and receiver sub-assembly using the method of the present invention. Various embodiments of a suitable demultiplexer chip for this alternate embodiment, and methods for making the same, are disclosed in co-pending U.S. patent application Ser. No. 09/810,998, entitled "Multi-Channel Optical Filter And Multiplexer Formed From Stacks Of Thin-Film Layers," assigned to the assignee of the present application and incorporated herein by reference in its entirety. In this alternate embodiment, a combined optical signal with light of different wavelengths (e.g., $\lambda_1, \lambda_2, \lambda_3, \lambda_4$) is provided by the optical fiber 140 to the interior of the optical demultiplexer chip, where the different wavelengths (e.g., $\lambda_1, \lambda_2, \lambda_3, \lambda_4$) in the combined single are separated and output to the array of photodetectors, each of which receives light of a different wavelength.

In further embodiments, some or all of the polymer grippers 110, 310 may be replaced with stops having raised ridges that are formed on the silicon optical benches 100, 300 using wet-etching or chemical-plasma etching. Optionally, stops may be positioned on the silicon optical benches using photo-lithography to achieve a positional accuracy of less than 1 μm. Other methods for forming or providing stops on the optical benches will be understood by those skilled in the art, and are considered to be within the scope of the present invention.

Figure 13A:
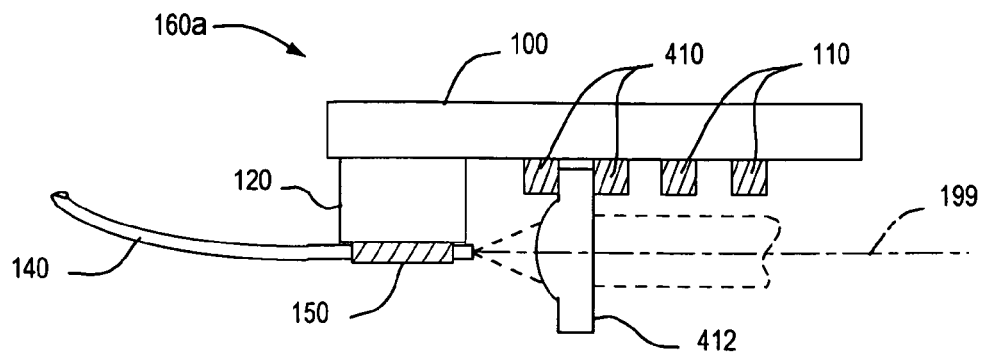
FIGS. 13A–13C illustrate a further embodiment of the present invention that may be used to form a more basic optical sub-assembly.
Figure 13B:
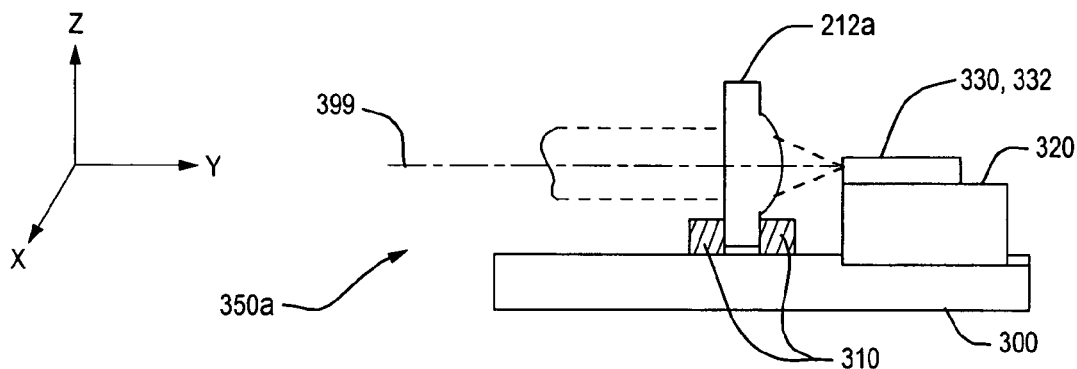
Figure 13C:
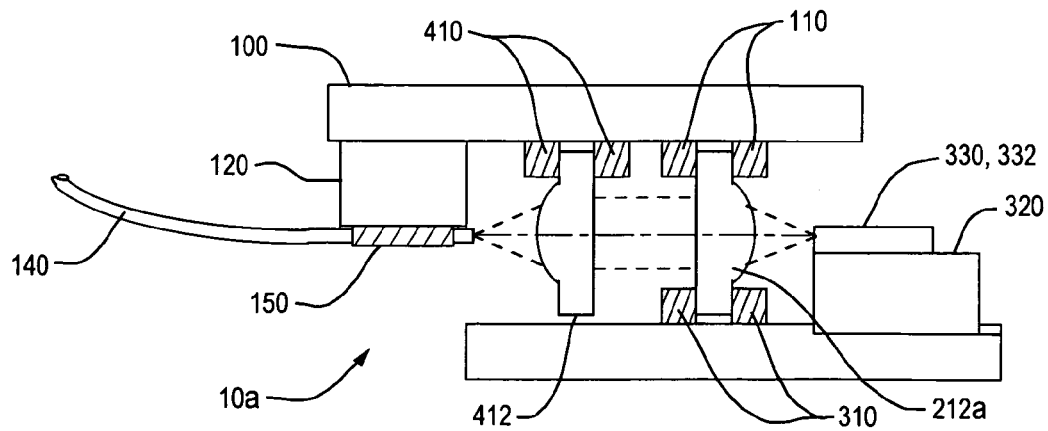

Referring now to FIGS. 13a, 13b, 13c, in a basic embodiment of the present invention, the bench joining optical component could simply be formed from a single lens 212a (rather than an optical multiplexer chip and an array of lenses), and the array of laser diodes could be replaced with a single laser diode 330 or a single photodetector 332. FIG. 13a illustrates the method for making the first portion 160a of optical sub-assembly 10a. Optical fiber 140 is positioned within grippers 150, which restrict the optical fiber to movement along the Y-axis. Two pairs of stops 110 and 410 (polymer grippers are shown, by way of example) are provided, and a single lens 412 is positioned within polymer grippers 410 on first bench 100. The lens 412 is then aligned with optical fiber 140 along a first optical axis 199 using known alignment methods, by moving the lens 412 within the X-Z plane and moving the fiber 140 along the Y axis. When the lens 412 and the fiber 140 are aligned, the lens is permanently secured to first bench 100 and the fiber permanently secured to sub-bench 120 by means disclosed above. Following completion of first portion 160a, all components in the first portion 160a are pre-aligned and fixed with respect to each other, moving as a unit. FIG. 13b illustrates the method for making the second portion 350a of optical sub-assembly 10a. A further pair of stops (e.g., polymer grippers 310) are provided on second optical bench 300. Sub-bench 320 is also provided on optical bench 300. A laser diode 330 (or photodetector 332) is aligned and permanently coupled to sub-bench 320. The bench-joining component (a single lens) 212a is positioned within stops 310. Bench-joining component 212a is then aligned with diode 330 (or detector 332) along a second optical axis 399 using known alignment methods, by moving the bench-joining component 212a within the X-Z plane. When the bench-joining component 212a and the diode 330 (or detector 332) are aligned, the bench-joining component 212a is permanently secured to second bench 300 by means disclosed above. Following completion of the second portion 350a, all components in the second portion 350a are pre-aligned and fixed with respect to each other, moving as a unit. FIG. 13c illustrates a cross-sectional view of an aligned optical sub-assembly 10a in accordance with this basic embodiment, and formed in accordance with the methods of the present invention. Briefly, the side of bench-joining optical component 212a opposite the optical bench 300 is positioned against the upper surface of bench 100, in the spaces between polymer grippers 110. The bench-joining optical component 212a is then moved in the X-Z plane within grippers 110 in order to align optical axis 199 coincident with optical axis 399, after which bench-joining optical component 212a is permanently fixed to bench 100 and grippers 110 by means disclosed above.

Figure 14:
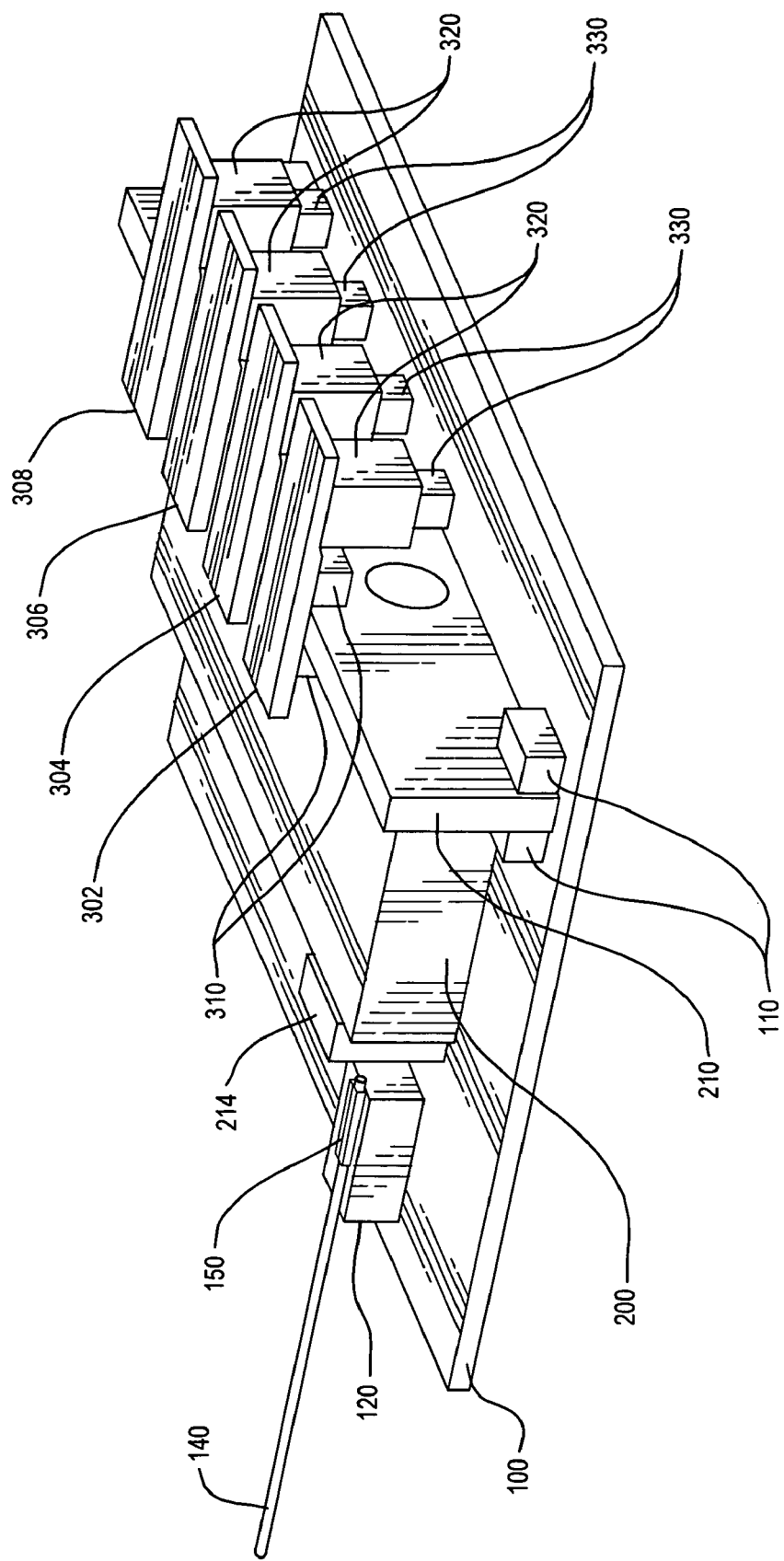
FIG. 14 shows a still further embodiment of a completed optical sub-assembly formed in accordance with the present invention.

FIG. 14 shows a still further embodiment of a completed optical sub-assembly formed in accordance with the present invention. In the embodiment shown in FIG. 14, the bench-joining optical component 220 is formed by bonding lens array 210 to one side of optical multiplexer chip 200 and bonding lens 214 to the other side of optical multiplexer chip 200. With the exception of the addition of lens 214, the first portion of the optical sub-assembly of FIG. 14 is formed substantially in accordance with FIGS. 3–8 discussed above.

In contrast to the sub-assembly shown in FIG. 12 which includes only one optical bench (e.g., optical bench 300) in addition to the first optical bench 100, the embodiment shown in FIG. 14 includes four optical benches (e.g., benches 302, 304, 306, 308) in addition to first optical bench 100. Each optical bench 302, 304, 306, 308 has pairs of stops (e.g., polymer grippers 310) provided on the upper surface of the bench. A sub-bench 320 is also provided on each optical bench 302, 304, 306, 308, and a laser diode 330 is aligned and permanently coupled to each sub-bench 320. Initially, bench 302, sub-bench 320 and laser diode 330 are fixed with respect to each other, moving as a first unit; bench 304, sub-bench 320 and laser diode 330 are fixed with respect to each other, moving as a second unit; bench 306, sub-bench 320 and laser diode 330 are fixed with respect to each other, moving as a third unit; and bench 308, sub-bench 320 and laser diode 330 are fixed with respect to each other, moving as a fourth unit.

Next, the first portion of the optical sub-assembly shown in FIG. 14 (i.e., first silicon optical bench 100, the components affixed to the first bench, and bench-joining optical component 220 all fixed with respect to each other, moving as a unit) is combined with the four units discussed above (i.e., the units which respectively include optical benches 302, 304, 306 and 308). For example, the side of bench-joining optical component 220 opposite the first optical bench 100 is positioned against the upper surface of bench 302, in the spaces between the pairs of polymer grippers 310. When the bench-joining optical component 220 is positioned in the spaces between the pairs of polymer grippers 310 on bench 302, the polymer grippers restrict rotation of the bench-joining optical component 220 about an axis perpendicular to the upper surface of optical bench 302 and a distance between the laser diode 330 on bench 302 and the bench-joining optical component 220 is fixed. The bench-joining optical component 220 is then aligned with the laser diode 330 on bench 302 using either active or passive alignment methods. During this process, the bench-joining optical component 220 may be moved along the X-axis and Z-axis as shown previously in FIG. 11, or rotated about any axis perpendicular to the X-Z plane, in order to bring the bench-joining optical component 220 and laser diode 330 into alignment. (It will be understood that, in this alignment step, the position of the bench-joining optical component 220 relative to bench 302 could be varied by moving either the bench-joining optical component 220, bench 302, or both). When the bench-joining optical component 220 and the laser diode 330 are aligned, a curable epoxy is applied in order to permanently secure the bench-joining optical component 220 to the bench 302. The above process is then repeated for the each of the remaining units (i.e., the units that include benches 304, 306, 308), in order to complete the optical sub-assembly shown in FIG. 14. Following completion of optical sub-assembly, all components in the assembly are aligned and fixed with respect to each other, moving as a unit. In the embodiment shown, the upper surface of silicon optical benches 100 is parallel to the upper surfaces of optical benches 302, 304, 306, 308 in the completed optical sub-assembly.

By extension of the embodiment shown in FIG. 14, another embodiment (not shown) provides a plurality of bench-joining components on a first bench. Then a plurality of additional benches, such as 302–308 in FIG. 14, is attached and aligned to the first bench, each via its own, separate bench-joining component, by the methods of the present invention described above.

Although in the embodiments described above, the bench-joining component is shown "sandwiched" between substantially parallel optical benches, each bench on opposite sides of the bench-joining component, another series of embodiments (not shown) provides a three-sided, four-sided, five-sided, etc. bench-joining component. For example, a rectangular (four-sided) bench-joining component is joined to four optical benches, each gripping to one of the four exposed, straight edges of the bench-joining component. The four optical benches, each with pre-aligned and secured optical component(s) thereon, are assembled to the bench-joining component and aligned according to the methods of the present invention described above.

Although in the embodiments described above, some of the optical benches were described as being formed from silicon, the present invention is applicable to optical benches formed of other materials such as, for example, ceramics, glass, metals, printed circuit boards and other semiconductors substrates such as indium phosphide. Likewise, although in the embodiments described above, only components such as optical diodes, lenses, multiplexers and fibers were specified, the present invention is applicable to optical and optoelectronic components such as polarizers, beam splitters, attenuators, apertures, isolators, collimators, filters, gratings, prisms, mirrors, waveguides, ferrules, modulators and others, plus arrays of such. Similarly, although in the embodiments described above, only finished sub-assemblies comprising optical transmitters or optical receivers were specified, the present invention is applicable to optical and optoelectronic sub-assemblies such as switches, add-drop multiplexers, amplifiers, power monitors, sensors, imagers and optical micro-electro-mechanical systems (MEMS).

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method for aligning optical components in order to form an aligned optical sub-assembly, comprising:
    (a) positioning a first optical component with respect to a first optical bench having an upper surface;
    (b) positioning a bench-joining optical component relative to the upper surface of the first optical bench;
    (c) after steps (a) and (b), providing actively aligned optical components by moving at least one of the bench-joining optical component and the first optical bench until an acceptable throughout of optical signal is detected through the first optical component and the bench-joining optical component;
    (d) after step (c), and while said aligned components remain in an aligned position, permanently securing at least the bench-joining optical component to the first optical bench;
    (e) permanently securing a third optical component to a second optical bench having an upper surface;
    (f) after steps (d) and (e), and after the first and bench-joining optical components are permanently secured to the first optical bench, positioning the bench-joining optical component relative to the upper surface of the second optical bench;
    (g) after step (f), providing an actively aligned optical sub-assembly by moving at least one of the bench-joining optical component and the second optical bench until an acceptable throughout of optical signal is detected through the bench-joining optical component and the third optical component; and
    (h) after step (g), permanently securing the bench-joining optical component to the second optical bench;
    said method further comprising permanently securing said first optical component to the first optical bench in step (a) or step (d).

2. The method of claim 1 wherein the first optical component is one or more optical fibers.

3. A method for aligning optical components in order to form an aligned optical sub-assembly, comprising:
    (a) positioning a first optical component with respect to a first optical bench having an upper surface;
    (b) positioning a bench-joining optical component relative to the upper surface of the first optical bench;
    (c) after steps (a) and (b), providing aligned optical components by moving at least one of the bench-joining optical component and the first optical bench until the first optical component and the bench-joining optical component are optically aligned;

(d) after step (c), and while said aligned components remain in an aligned position, permanently securing at least the bench-joining optical component to the first optical bench;

(e) permanently securing a third optical component to a second optical bench having an upper surface;

(f) after steps (d) and (e), and after the first and bench-joining optical components are permanently secured to the first optical bench, positioning the bench-joining optical component relative to the upper surface of the second optical bench;

(g) after step (f), providing an aligned optical sub-assembly by moving at least one of the bench-joining optical component and the second optical bench until the bench-joining optical component and the third optical component are optically aligned; and (h) after step (g), permanently securing the bench-joining optical component to the second optical bench;

said method further comprising permanently securing said first optical component to the first optical bench in step (a) or step (d);

wherein the first optical component is one or more optical fibers and the bench-joining optical component comprises an optical multiplexer and a lens array.

4. A method for aligning optical components in order to form an aligned optical sub-assembly, comprising:

(a) positioning a first optical component with respect to a first optical bench having an upper surface;

(b) positioning a bench-joining optical component relative to the upper surface of the first optical bench;

(c) after steps (a) and (b), providing aligned optical components by moving at least one of the bench-joining optical component and the first optical bench until the first optical component and the bench-joining optical component are optically aligned;

(d) after step (c), and while said aligned components remain in an aligned position, permanently securing at least the bench-joining optical component to the first optical bench;

(e) permanently securing a third optical component to a second optical bench having an upper surface;

(f) after steps (d) and (e), and after the first and bench-joining optical components are permanently secured to the first optical bench, positioning the bench-joining optical component relative to the upper surface of the second optical bench;

(g) after step (f), providing an aligned optical sub-assembly by moving at least one of the bench-joining optical component and the second optical bench until the bench-joining optical component and the third optical component are optically aligned; and (h) after step (g), permanently securing the bench-joining optical component to the second optical bench;

said method further comprising permanently securing said first optical component to the first optical bench in step (a) or step (d);

wherein the third optical component is an array of laser diodes.

5. The method of claim 1 wherein the bench-joining optical component consists of a single optical lens.

6. The method of claim 1, wherein the upper surface of the first optical bench is parallel to the upper surface of the second optical bench after step (h).

7. The method of claim 1, wherein the bench-joining optical component comprises an array of optical lenses.

8. The method of claim 1, wherein the first optical component is permanently secured to the first optical bench in step (a), the bench-joining optical component is permanently secured to the first optical bench in step (d), and the positioning of the bench-joining optical component relative to the upper surface of the first optical bench in step (b) fixes a distance between the first optical component and the bench-joining optical component.

9. The method of claim 1, wherein the first optical component and the bench-joining optical component are permanently secured to the first optical bench in step (d).

10. The method of claim 1, wherein, following step (b), translational movement of the bench-joining optical component relative to the upper surface of the first optical bench is restricted in at least one direction parallel to the upper surface of the first optical bench and rotational movement of the bench-joining optical component about at least one axis passing through the bench-joining optical component and perpendicular to the upper surface of the first optical bench is restricted.

11. The method of claim 10, wherein the upper surface of the first optical bench has a first plurality of stops formed thereon, and step (b) further comprises positioning the bench-joining optical component on the upper surface of the first optical bench between the first plurality of stops, wherein said first plurality of stops restrict rotation of the bench-joining optical component about an axis perpendicular to the upper surface of the first optical bench.

12. The method of claim 1, wherein, following step (f), translational movement of the bench-joining optical component relative to the upper surface of the second optical bench is restricted in at least one direction parallel to the upper surface of the second optical bench, rotational movement of the bench-joining optical component about at least one axis passing through the bench-joining optical component and perpendicular to the upper surface of the second optical bench is restricted, and a distance between the third optical component and the bench-joining optical component is fixed.

13. The method of claim 12, wherein the upper surface of the second optical bench has a second plurality of stops formed thereon, and step (f) further comprises positioning the bench-joining optical component on the upper surface of the second optical bench between the second plurality of stops, wherein said second plurality of stops restrict rotation of the bench-joining optical component about an axis perpendicular to the upper surface of the second optical bench.

14. A method for aligning optical components in order to form an aligned optical sub-assembly, comprising:

(a) positioning a first optical component with respect to a first optical bench having an upper surface;

(b) positioning a bench-joining optical component relative to the upper surface of the first optical bench;

(c) after steps (a) and (b), providing aligned optical components by moving at least one of the bench-joining optical component and the first optical bench until the first optical component and the bench-joining optical component are optically aligned;

(d) after step (c), and while said aligned components remain in an aligned position, permanently securing at least the bench-joining optical component to the first optical bench;

(e) permanently securing a third optical component to a second optical bench having an upper surface;

(f) after steps (d) and (e), and after the first and bench-joining optical components are permanently secured to the first optical bench, positioning the bench-joining optical component relative to the upper surface of the second optical bench;

(g) after step (f), providing an aligned optical sub-assembly by moving at least one of the bench-joining optical component and the second optical bench until the bench-joining optical component and the third optical component are optically aligned; and (h) after step (g), permanently securing the bench-joining optical component to the second optical bench;

said method further comprising permanently securing said first optical component to the first optical bench in step (a) or step (d);

wherein, following step (b), translational movement of the bench-joining optical component relative to the upper surface of the first optical bench is restricted in at least one direction and rotational movement of the bench-joining optical component about at least one axis passing through the bench-joining optical component is restricted;

wherein the upper surface of the first optical bench has a first plurality of stops formed thereon, and step (b) further comprises positioning the bench-joining optical component on the upper surface of the first optical bench between the first plurality of stops, wherein said first plurality of stops restrict rotation of the bench-joining optical component about an axis perpendicular to the upper surface of the first optical bench;

wherein the first plurality of stops are formed from a de-formable material that grips the bench-joining optical component when the bench-joining optical component is positioned between the first plurality of stops.

15. The method of claim 14, wherein said de-formable material is a polymer.

16. A method for aligning optical components in order to form an aligned optical sub-assembly, comprising:

(a) positioning a first optical component with respect to a first optical bench having an upper surface;

(b) positioning a bench-joining optical component relative to the upper surface of the first optical bench;

(c) after steps (a) and (b), providing aligned optical components by moving at least one of the bench-joining optical component and the first optical bench until the first optical component and the bench-joining optical component are optically aligned;

(d) after step (c), and while said aligned components remain in an aligned position, permanently securing at least the bench-joining optical component to the first optical bench;

(e) permanently securing a third optical component to a second optical bench having an upper surface;

(f) after steps (d) and (e), and after the first and bench-joining optical components are permanently secured to the first optical bench, positioning the bench-joining optical component relative to the upper surface of the second optical bench;

(g) after step (f), providing an aligned optical sub-assembly by moving at least one of the bench-joining optical component and the second optical bench until the bench-joining optical component and the third optical component are optically aligned; and (h) after step (g), permanently securing the bench-joining optical component to the second optical bench;

said method further comprising permanently securing said first optical component to the first optical bench in step (a) or step (d);

wherein, following step (f), translational movement of the bench-joining optical component relative to the upper surface of the second optical bench is restricted in at least one direction, rotational movement of the bench-joining optical component about at least one axis passing through the bench-joining optical component is restricted, and a distance between the third optical component and the bench-joining optical component is fixed;

wherein the upper surface of the second optical bench has a second plurality of stops formed thereon, and step (f) further comprises positioning the bench-joining optical component on the upper surface of the second optical bench between the second plurality of stops, wherein said second plurality of stops restrict rotation of the bench-joining optical component about an axis perpendicular to the upper surface of the second optical bench;

wherein the second plurality of stops are formed from a de-formable material that grips the bench-joining optical component when the bench-joining optical component is positioned between the second plurality of stops.

17. The method of claim 16, wherein said de-formable material is a polymer.

18. The method of claim 11, wherein the first optical bench is formed from silicon, further comprising the step of wet-etching the first plurality of stops into the first optical bench.

19. The method of claim 18, wherein the first plurality of stops comprises raised ridges, and said wet-etching comprises etching a remaining surface of the first optical bench.

20. The method of claim 11, wherein the first optical bench is formed from silicon, further comprising the step of etching the first plurality of stops into the first optical bench by plasma-chemical etching.

21. The method of claim 20, wherein the first plurality of stops comprises raised ridges, and said etching comprises etching a remaining surface of the first optical bench by plasma-chemical etching.

22. The method of claim 11, wherein the first optical bench is formed from silicon, and the first plurality of stops are positioned on the first optical bench using photo-lithography to achieve a positional accuracy of less than 1 $\mu$m.

23. The method of claim 1, further comprising:

(i) permanently securing a fourth optical component to a third optical bench having an upper surface;

(j) after steps (g) and (i), positioning the bench-joining optical component relative to the upper surface of the third optical bench;

(k) after step (j), moving at least one of the bench-joining optical component or the third optical bench until the bench-joining optical component and the fourth optical component are optically aligned; and (l) after step (k), permanently securing the bench-joining optical component to the third optical bench.

24. The method of claim 23, further comprising:

(m) permanently securing a fifth optical component to a fourth optical bench having an upper surface;

(n) after steps (g) and (m), positioning the bench-joining optical component relative to the upper surface of the fourth optical bench;

(o) after step (n), moving at least one of the bench-joining optical component or the fourth optical bench until the bench-joining optical component and the fifth optical component are optically aligned; and (p) after step (o), permanently securing the bench-joining optical component to the fourth optical bench.

25. The method of claim 24, further comprising:

(q) permanently securing a sixth optical component to a fifth optical bench having an upper surface;

(r) after steps (g) and (q), positioning the bench-joining optical component relative to the upper surface of the fifth optical bench;

(s) after step (r), moving at least one of the bench-joining optical component or the fifth optical bench until the bench-joining optical component and the sixth optical component are optically aligned; and (t) after step (o), permanently securing the bench-joining optical component to the fifth optical bench.

26. A method for aligning optical components in order to form an aligned optical sub-assembly, comprising:

(a) positioning a first optical component with respect to a first optical bench having an upper surface;

(b) positioning a bench-joining optical component relative to the upper surface of the first optical bench;

(c) after steps (a) and (b), providing aligned optical components by moving at least one of the bench-joining optical component and the first optical bench until the first optical component and the bench-joining optical component are optically aligned;

(d) after step (c), and while said aligned components remain in an aligned position, permanently securing at least the bench-joining optical component to the first optical bench;

(e) permanently securing a third optical component to a second optical bench having an upper surface;

(f) after steps (d) and (e), and after the first and bench-joining optical components are permanently secured to the first optical bench, positioning the bench-joining optical component relative to the upper surface of the second optical bench;

(g) after step (f), providing an aligned optical sub-assembly by moving at least one of the bench-joining optical component and the second optical bench until the bench-joining optical component and the third optical component are optically aligned; and (h) after step (g), permanently securing the bench-joining optical component to the second optical bench;

said method further comprising permanently securing said first optical component to the first optical bench in step (a) or step (d);

wherein the bench-joining optical component comprises an optical multiplexer and a lens array.

* * * * *